US010626046B2

(12) United States Patent
Beall et al.

(10) Patent No.: US 10,626,046 B2
(45) Date of Patent: Apr. 21, 2020

(54) GLASS CERAMICS

(71) Applicant: Corning Incorporated, Corning, NY (US)

(72) Inventors: George Halsey Beall, Big Flats, NY (US); Qiang Fu, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/728,783

(22) Filed: Oct. 10, 2017

(65) Prior Publication Data
US 2018/0099901 A1    Apr. 12, 2018

Related U.S. Application Data

(60) Provisional application No. 62/407,218, filed on Oct. 12, 2016.

(51) Int. Cl.
| | |
|---|---|
| *C03C 10/12* | (2006.01) |
| *C03B 32/02* | (2006.01) |
| *C03C 10/00* | (2006.01) |
| *C03C 3/097* | (2006.01) |

(52) U.S. Cl.
CPC .......... *C03C 10/0027* (2013.01); *C03B 32/02* (2013.01); *C03C 3/097* (2013.01); *C03C 10/0009* (2013.01); *C03C 10/0054* (2013.01); *C03C 2204/00* (2013.01)

(58) Field of Classification Search
CPC ................................................. C03C 10/0027
See application file for complete search history.

(56) References Cited

U.S. PATENT DOCUMENTS

| | | | |
|---|---|---|---|
| 3,625,718 A | 12/1971 | Petticrew | |
| 5,017,519 A | 5/1991 | Morimoto et al. | |
| 5,173,453 A | 12/1992 | Beall et al. | |
| 5,336,643 A | 8/1994 | Goto et al. | |
| 5,691,256 A | 11/1997 | Taguchi et al. | |
| 5,785,726 A | 7/1998 | Dorfeld et al. | |
| 5,824,127 A | 10/1998 | Bange et al. | |
| 5,972,816 A | 10/1999 | Goto | |
| 6,048,589 A | 4/2000 | Suzuki et al. | |
| 6,128,924 A | 10/2000 | Bange et al. | |
| 6,387,509 B1 | 5/2002 | Goto et al. | |
| 6,413,906 B1 * | 7/2002 | Shimatani | C03C 10/0027 501/4 |
| 6,420,288 B2 | 7/2002 | Schweiger et al. | |
| 6,472,338 B1 * | 10/2002 | Shimatani | C03C 1/004 501/4 |
| 6,593,258 B1 | 7/2003 | Shimatani et al. | |
| 7,169,476 B2 | 1/2007 | Ota et al. | |
| 7,220,690 B2 | 5/2007 | Mitra et al. | |
| 7,476,633 B2 | 1/2009 | Comte et al. | |
| 7,696,113 B2 | 4/2010 | Ellison | |
| 8,257,831 B2 | 9/2012 | Yagi | |
| 8,664,130 B2 | 3/2014 | Beall et al. | |
| 8,741,791 B2 | 6/2014 | Kim et al. | |
| 9,115,023 B2 | 8/2015 | Beall et al. | |
| 9,133,054 B2 | 9/2015 | Beall et al. | |
| 9,260,342 B2 * | 2/2016 | Borczuch-Laczka | A61K 6/0235 |
| 9,351,807 B2 | 5/2016 | Hoscheler | |
| 2004/0110623 A1 | 6/2004 | Hsu et al. | |
| 2005/0016521 A1 | 1/2005 | Witzmann et al. | |
| 2006/0142138 A1 | 6/2006 | Sakamoto | |
| 2006/0160689 A1 | 7/2006 | Hsu et al. | |
| 2006/0242996 A1 | 11/2006 | Deangelis et al. | |
| 2011/0092353 A1 | 4/2011 | Amin et al. | |
| 2014/0141960 A1 * | 5/2014 | Borczuch-Laczka | A61K 6/0235 501/32 |
| 2014/0243183 A1 | 8/2014 | Beall et al. | |
| 2014/0370464 A1 * | 12/2014 | Kounga | A61C 13/00 433/212.1 |
| 2015/0104655 A1 | 4/2015 | Kim et al. | |
| 2016/0009591 A1 | 1/2016 | Plevacova et al. | |
| 2016/0102010 A1 | 4/2016 | Beall et al. | |
| 2016/0152512 A9 | 6/2016 | Beall et al. | |
| 2016/0159682 A1 * | 6/2016 | Borczuch-Laczka | A61K 6/0235 501/32 |

FOREIGN PATENT DOCUMENTS

| | | | | |
|---|---|---|---|---|
| JP | S5849635 A | 3/1983 | | |
| JP | S6153131 A | 3/1986 | | |
| JP | 11100230 A | 4/1999 | | |
| JP | H11228180 A | 8/1999 | | |
| JP | 2001019491 A | 1/2001 | | |
| JP | 2002154840 A | 5/2002 | | |
| JP | 2002326837 A * | 11/2002 | ............. | C03B 11/10 |
| JP | 2003192385 A | 7/2003 | | |

(Continued)

OTHER PUBLICATIONS

International Search Report and Written Opinion PCT/US2017/055831 dated Jan. 4, 2018.
Beall; "Design and Properties of Glass-Ceramics"; Annu. Rev. Mater. Sci. 1992; 22:91-119.
Hu et al; "Crystallization of Spodumeme-Diopside in the Las Glass Ceramics With CaO and MgO Addition"; Journal of Thermal Analysis and Calorimetry, vol. 90 (2007) 1, 185-189.
Reddy et al; "Fracture Toughness Measurement of Glass and Ceramic Materials Using Chevron-Notched Specimens"; J. Am. Ceram. Soc., 71 [6] C-310-C313 (1998).

\* cited by examiner (Continued)

*Primary Examiner* — Karl E Group
(74) *Attorney, Agent, or Firm* — Russell S. Magaziner (57) ABSTRACT

A group of glass-ceramic compositions nucleated with $ZrO_2$ and $P_2O_5$ can develop a microstructure composed of spherulite grains, which produce a high fracture toughness (about 1.5 MPa·m$^{0.5}$ or higher). Also, the glass-ceramic articles can be cerammed to have a CTE value of $30 \times 10^{-7}$/° C. or lower.

20 Claims, 3 Drawing Sheets

(56) References Cited

FOREIGN PATENT DOCUMENTS

| | | |
|---|---|---|
| JP | 2007126299 A | 5/2007 |
| RU | 2314272 C1 | 1/2008 |

GLASS CERAMICS

This application claims the benefit of priority under 35 U.S.C. § 119 of U.S. Provisional Application Ser. No. 62/407,218, filed on Oct. 12, 2016, the content of which is relied upon and incorporated herein by reference in its entirety.

INTRODUCTION

Glass-ceramics have found wide use and applications in many areas, including cooktops, dishware, electronics and architecture. For many of these applications, there is a need to provide materials with low thermal expansion while maintaining high strength and toughness. Improvements to the mechanical properties of glass-based materials are an ongoing focus within the materials community. In general, fracture toughness values in the range of 0.8 to 1.0 MPa·m$^{0.5}$ are reported for β-spodumene and β-quartz based glass-ceramics. New materials with low coefficient of thermal expansion (CTE), high fracture toughness and high strength are desired for applications in consumer products.

SUMMARY

A group of glass-ceramic compositions nucleated with $ZrO_2$ and $P_2O_5$ can develop a microstructure composed of β-spodumene and/or β-quartz grains of spherulite-like structure, which produce a high fracture toughness (about 1.5 MPa·m$^{0.5}$ or higher). Also, the CTE values of such glass-ceramics can range from $30 \times 10^{-7}/°$ C. or lower.

An aspect described herein relates to a group of white, translucent $Li_2O$—$Al_2O_3$—$SiO_2$—$ZrO_2$—$P_2O_5$ glass-ceramic compositions having a microstructure composed of β-spodumene and/or β-quartz grains. In various embodiments, the glass-ceramic articles have a higher fracture toughness (at least over 1.0 MPa·m$^{0.5}$) than traditional glass-ceramics nucleated with titanium dioxide, which enables production of thinner articles. In some embodiments, CTE values of $30 \times 10^{-7}/°$ C. or lower can be achieved in the claimed articles.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

As used herein, the term "grain size" refers to a dimension of a grain in a material. For a complete explanation of how the grain size is determined, see M. N. Rahaman, "*Ceramic Processing*," CRC press, 2006, ISBN 9780849372858, herein incorporated by reference in its entirety. In short, the grain size is the average dimension of the particles observed in a cross section of a material. The average dimension of a particular grain is the diameter of a circle having the same area as the grain. The average grain size of the material is calculated by adding up the average dimension of all the grains in a cross section, and dividing by the number of grains in an SEM image. Typically, yield strength and brittleness both increase with decreasing grain size.

As used herein, the term "CTE" refers to the coefficient of thermal expansion of the glass composition averaged over a temperature range from 20° C. to 300° C.

As used herein, the term "RoR" refers to the strength of a material as measured by the ring-on-ring test, which determines the elastic modulus and fracture strength of brittle materials in plate geometry. The RoR tests were generally performed according to the ASTM C-1499-03 standard test method for *Monotonic Equibiaxial Flexural Strength of Advanced Ceramics at Ambient Temperatures*, with the load applied at a rate of 1.2 mm/min at 20° C. in 50% relative humidity, wherein the radius of curvature on the rings is $\frac{1}{16}$ inch, hereby incorporated by reference. The average RoR, <RoR>, for each composition was a calculated average based on a measurement of at least five RoR tests for the composition. The maximum RoR, RoR$_{max}$, value for each composition was the single highest RoR value found for the composition. As used herein, when not specifically noted, RoR is meant to be the average RoR value for a composition.

As used herein, the term "fracture toughness" or "K1c" refers to the ability of a material containing a crack to resist fracture. The fracture toughness can be a particularly important property for design applications, especially where breakage due to impact is a real concern. The fracture toughness of the samples was found via the chevron-notch four point bend methods described in Reddy et al., *Fracture Toughness Measurement of Glass and Ceramic Materials Using Chevron-Notched Specimens*, 71 J. Am. Ceram. Soc. C-310-C-313 (1988), herein incorporated by reference. The average fracture toughness, <K1c>, for each composition was a calculated average based on a measurement of at least five tests for the composition. The maximum fracture toughness value, K1c$_{max}$ for each composition was the single highest K1c value found for the composition. As used herein, when not specifically noted, fracture toughness is meant to be the average fracture toughness value for a composition.

Where a range of numerical values is recited herein, comprising upper and lower values, unless otherwise stated in specific circumstances, the range is intended to include the endpoints thereof, and all integers and fractions within the range. It is not intended that the scope of the claims be limited to the specific values recited when defining a range. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. When a numerical value or end-point of a range does not recite "about," the numerical value or end-point of a range is intended to include two embodiments: one modified by "about," and one not modified by "about."

The term "or", as used herein, is inclusive; more specifically, the phrase "A or B" means "A, B, or both A and B." Exclusive "or" is designated herein by terms such as "either A or B" and "one of A or B", for example.

The term "wherein" is used as an open-ended transitional phrase, to introduce a recitation of a series of characteristics of the structure.

As used herein, a glass composition having 0 wt % or 0 mol % of a compound is defined as meaning that the compound, molecule, or element is not present in the composition. Similarly, "substantially free of alkali metal", "substantially free of sodium", "substantially free of potassium", "sodium-free," "alkali-free," "potassium-free" or the like are defined to mean that the compound, molecule, or element was not purposefully added to the composition, and, if present, it is not present in more than trace amounts that do not significantly affect material properties. As used herein, trace amounts would be amounts of 0.2% or less, 0.1% or less, 0.01% or less, 0.005% or less, 0.001% or less, 0.0005% or less, or 0.0001% or less, or that in fact the constituent is not detectable in the glass composition.

In some embodiments, a glass composition having an undetectable amount of a compound is defined as meaning that compound, molecule, or element is not detectable using X-ray fluorescence, but the composition may still include the compound in trace amounts that do not significantly affect material properties. Detectable values of components of a composition are about 0.0001 wt % or greater.

The present disclosure is based on the discovery of new glass compositions that can be cerammed to produce white translucent glass-ceramics with low thermal expansion and high fracture toughness. The glass-ceramics form spherulite grains in their structures, which produces more resistance to crack propagation.

Concentrations of various components of glass and glass ceramic compositions described herein are expressed in terms of wt % on an oxide bases unless otherwise indicated. Any component having more than one oxidation state may be present in a glass composition in any oxidation state. However, concentrations of such component are expressed in terms of a single oxide unless otherwise indicated.

In one embodiment, a precursor glass (and the ceramic composition made by ceramming the glass) comprises, as represented by mass percentage on an oxide basis:

60-75 wt % $SiO_2$
10-20 wt % $Al_2O_3$
0-4 wt % $B_2O_3$
4-14 wt % $Li_2O$
>0 to 5 wt % $Na_2O$
0-4 wt % $K_2O$
0-8 wt % MgO
0-8 wt % ZnO
>0 to 8 wt % $ZrO_2$
0-4 wt % $TiO_2$, and
>0 to 5 wt % $P_2O_5$.

In some embodiments, the compositions described above further comprise less than 2%, less than 1%, or less than 0.5 wt % of any other oxides.

In some embodiments, the composition has one or more of the following limitations on levels of oxides in the glass: 1) 60 to 70 wt % silicon dioxide; 2) 12 to 16 wt % aluminum oxide; 3) 5 to 9 wt % lithium oxide; 4) 0.5 to 2 wt % sodium oxide; 5) 1 to 3 wt % magnesium oxide; 6) 2 to 4 wt % zinc oxide; 7) 0.5 to 4 wt % zirconium oxide; and 8) 1 to 3 wt % phosphorus pentoxide. Such embodied compositions are shown in Table 1, in wt %:

TABLE 1

| Oxide (wt %) | 1 | 2 | 3 | 4 | 5 | 6 | 7 | 8 | 9 |
|---|---|---|---|---|---|---|---|---|---|
| $SiO_2$ | 60-75 | 60-70 | 60-75 | 60-75 | 60-75 | 60-75 | 60-75 | 60-75 | 60-75 |
| $Al_2O_3$ | 10-20 | 10-20 | 12-16 | 10-20 | 10-20 | 10-20 | 10-20 | 10-20 | 10-20 |
| $B_2O_3$ | 0-4 | 0-4 | 0-4 | 0-4 | 0-4 | 0-4 | 0-4 | 0-4 | 0-4 |
| $Li_2O$ | 4-14 | 4-14 | 4-14 | 5-9 | 4-14 | 4-14 | 4-14 | 4-14 | 4-14 |
| $Na_2O$ | >0-5 | >0-5 | >0-5 | >0-5 | 0.5-2 | >0-5 | >0-5 | >0-5 | >0-5 |
| $K_2O$ | 0-4 | 0-4 | 0-4 | 0-4 | 0-4 | 0-4 | 0-4 | 0-4 | 0-4 |
| MgO | 0-8 | 0-8 | 0-8 | 0-8 | 0-8 | 1-3 | 0-8 | 0-8 | 0-8 |
| ZnO | 0-8 | 0-8 | 0-8 | 0-8 | 0-8 | 0-8 | 2-4 | 0-8 | 0-8 |
| $ZrO_2$ | >0-8 | >0-8 | >0-8 | >0-8 | >0-8 | >0-8 | >0-8 | 0.5-4 | >0-8 |
| $TiO_2$ | 0-4 | 0-4 | 0-4 | 0-4 | 0-4 | 0-4 | 0-4 | 0-4 | 0-4 |
| $P_2O_5$ | >0-5 | >0-5 | >0-5 | >0-5 | >0-5 | >0-5 | >0-5 | >0-5 | 1-3 |

| Oxide (wt %) | 10 | 11 | 12 | 13 | 14 | 15 | 16 | 17 | 18 |
|---|---|---|---|---|---|---|---|---|---|
| $SiO_2$ | 60-70 | 60-70 | 60-70 | 60-70 | 60-70 | 60-70 | 60-70 | 60-70 | 60-70 |
| $Al_2O_3$ | 12-16 | 10-20 | 10-20 | 10-20 | 10-20 | 10-20 | 10-20 | 12-16 | 12-16 |
| $B_2O_3$ | 0-4 | 0-4 | 0-4 | 0-4 | 0-4 | 0-4 | 0-4 | 0-4 | 0-4 |
| $Li_2O$ | 4-14 | 5-9 | 4-14 | 4-14 | 4-14 | 4-14 | 4-14 | 5-9 | 4-14 |
| $Na_2O$ | >0-5 | >0-5 | 0.5-2 | >0-5 | >0-5 | >0-5 | >0-5 | >0-5 | 0.5-2 |
| $K_2O$ | 0-4 | 0-4 | 0-4 | 0-4 | 0-4 | 0-4 | 0-4 | 0-4 | 0-4 |
| MgO | 0-8 | 0-8 | 0-8 | 1-3 | 0-8 | 0-8 | 0-8 | 0-8 | 0-8 |
| ZnO | 0-8 | 0-8 | 0-8 | 0-8 | 2-4 | 0-8 | 0-8 | 0-8 | 0-8 |
| $ZrO_2$ | >0-8 | >0-8 | >0-8 | >0-8 | >0-8 | 0.5-4 | >0-8 | >0-8 | >0-8 |

TABLE 1-continued

| | | | | | | | | | |
|---|---|---|---|---|---|---|---|---|---|
| TiO$_2$ | 0-4 | 0-4 | 0-4 | 0-4 | 0-4 | 0-4 | 0-4 | 0-4 | 0-4 |
| P$_2$O$_5$ | >0-5 | >0-5 | >0-5 | >0-5 | >0-5 | >0-5 | 1-3 | >0-5 | >0-5 |

| Oxide (wt %) | 19 | 20 | 21 | 22 | 23 | 24 | 25 | 26 | 27 |
|---|---|---|---|---|---|---|---|---|---|
| SiO$_2$ | 60-70 | 60-70 | 60-70 | 60-70 | 60-70 | 60-70 | 60-70 | 60-70 | 60-70 |
| Al$_2$O$_3$ | 12-16 | 12-16 | 12-16 | 12-16 | 12-16 | 12-16 | 12-16 | 12-16 | 12-16 |
| B$_2$O$_3$ | 0-4 | 0-4 | 0-4 | 0-4 | 0-4 | 0-4 | 0-4 | 0-4 | 0-4 |
| Li$_2$O | 4-14 | 4-14 | 4-14 | 4-14 | 5-9 | 4-14 | 4-14 | 4-14 | 4-14 |
| Na$_2$O | >0-5 | >0-5 | >0-5 | >0-5 | >0-5 | 0.5-2 | >0-5 | >0-5 | >0-5 |
| K$_2$O | 0-4 | 0-4 | 0-4 | 0-4 | 0-4 | 0-4 | 0-4 | 0-4 | 0-4 |
| MgO | 1-3 | 0-8 | 0-8 | 0-8 | 0-8 | 0-8 | 1-3 | 0-8 | 0-8 |
| ZnO | 0-8 | 2-4 | 0-8 | 0-8 | 0-8 | 0-8 | 0-8 | 2-4 | 0-8 |
| ZrO$_2$ | >0-8 | >0-8 | 0.5-4 | >0-8 | >0-8 | >0-8 | >0-8 | >0-8 | 0.5-4 |
| TiO$_2$ | 0-4 | 0-4 | 0-4 | 0-4 | 0-4 | 0-4 | 0-4 | 0-4 | 0-4 |
| P$_2$O$_5$ | >0-5 | >0-5 | >0-5 | 1-3 | >0-5 | >0-5 | >0-5 | >0-5 | >0-5 |

| Oxide (wt %) | 28 | 29 | 30 | 31 | 32 | 33 | 34 | 35 | 36 |
|---|---|---|---|---|---|---|---|---|---|
| SiO$_2$ | 60-70 | 60-70 | 60-70 | 60-70 | 60-70 | 60-70 | 60-70 | 60-70 | 60-70 |
| Al$_2$O$_3$ | 12-16 | 12-16 | 12-16 | 12-16 | 12-16 | 12-16 | 12-16 | 12-16 | 12-16 |
| B$_2$O$_3$ | 0-4 | 0-4 | 0-4 | 0-4 | 0-4 | 0-4 | 0-4 | 0-4 | 0-4 |
| Li$_2$O | 4-14 | 5-9 | 5-9 | 5-9 | 5-9 | 5-9 | 5-9 | 5-9 | 5-9 |
| Na$_2$O | >0-5 | 0.5-2 | >0-5 | >0-5 | >0-5 | >0-5 | 0.5-2 | 0.5-2 | 0.5-2 |
| K$_2$O | 0-4 | 0-4 | 0-4 | 0-4 | 0-4 | 0-4 | 0-4 | 0-4 | 0-4 |
| MgO | 0-8 | 0-8 | 1-3 | 0-8 | 0-8 | 0-8 | 1-3 | 0-8 | 0-8 |
| ZnO | 0-8 | 0-8 | 0-8 | 2-4 | 0-8 | 0-8 | 0-8 | 2-4 | 0-8 |
| ZrO$_2$ | 0.5-4 | >0-8 | >0-8 | >0-8 | 0.5-4 | >0-8 | >0-8 | >0-8 | 0.5-4 |
| TiO$_2$ | 0-4 | 0-4 | 0-4 | 0-4 | 0-4 | 0-4 | 0-4 | 0-4 | 0-4 |
| P$_2$O$_5$ | 1-3 | >0-5 | >0-5 | >0-5 | >0-5 | 1-3 | >0-5 | >0-5 | >0-5 |

| Oxide (wt %) | 37 | 38 | 39 | 40 | 41 | 42 | 43 | 44 | 45 |
|---|---|---|---|---|---|---|---|---|---|
| SiO$_2$ | 60-70 | 60-70 | 60-70 | 60-70 | 60-70 | 60-70 | 60-70 | 60-75 | 60-75 |
| Al$_2$O$_3$ | 12-16 | 12-16 | 12-16 | 12-16 | 12-16 | 12-16 | 12-16 | 12-16 | 12-16 |
| B$_2$O$_3$ | 0-4 | 0-4 | 0-4 | 0-4 | 0-4 | 0-4 | 0-4 | 0-4 | 0-4 |
| Li$_2$O | 5-9 | 5-9 | 5-9 | 5-9 | 5-9 | 5-9 | 5-9 | 5-9 | 4-14 |
| Na$_2$O | 0.5-2 | 0.5-2 | 0.5-2 | 0.5-2 | 0.5-2 | 0.5-2 | 0.5-2 | >0-5 | 0.5-2 |
| K$_2$O | 0-4 | 0-4 | 0-4 | 0-4 | 0-4 | 0-4 | 0-4 | 0-4 | 0-4 |
| MgO | 0-8 | 1-3 | 1-3 | 1-3 | 1-3 | 1-3 | 1-3 | 0-8 | 0-8 |
| ZnO | 0-8 | 2-4 | 0-8 | 0-8 | 2-4 | 2-4 | 2-4 | 0-8 | 0-8 |
| ZrO$_2$ | >0-8 | >0-8 | 0.5-4 | >0-8 | 0.5-4 | >0-8 | 0.5-4 | >0-8 | >0-8 |
| TiO$_2$ | 0-4 | 0-4 | 0-4 | 0-4 | 0-4 | 0-4 | 0-4 | 0-4 | 0-4 |
| P$_2$O$_5$ | 1-3 | >0-5 | >0-5 | 1-3 | >0-5 | 1-3 | 1-3 | >0-5 | >0-5 |

| Oxide (wt %) | 46 | 47 | 48 | 49 | 50 | 51 | 52 | 53 | 54 |
|---|---|---|---|---|---|---|---|---|---|
| SiO$_2$ | 60-75 | 60-75 | 60-75 | 60-75 | 60-75 | 60-75 | 60-75 | 60-75 | 60-75 |
| Al$_2$O$_3$ | 12-16 | 12-16 | 12-16 | 12-16 | 12-16 | 12-16 | 12-16 | 12-16 | 12-16 |
| B$_2$O$_3$ | 0-4 | 0-4 | 0-4 | 0-4 | 0-4 | 0-4 | 0-4 | 0-4 | 0-4 |
| Li$_2$O | 4-14 | 4-14 | 4-14 | 4-14 | 4-14 | 5-9 | 5-9 | 5-9 | 5-9 |
| Na$_2$O | >0-5 | >0-5 | >0-5 | >0-5 | >0-5 | 0.5-2 | >0-5 | >0-5 | >0-5 |
| K$_2$O | 0-4 | 0-4 | 0-4 | 0-4 | 0-4 | 0-4 | 0-4 | 0-4 | 0-4 |
| MgO | 0-8 | 1-3 | 0-8 | 0-8 | 0-8 | 0-8 | 1-3 | 0-8 | 0-8 |
| ZnO | 0-8 | 0-8 | 2-4 | 0-8 | 0-8 | 0-8 | 0-8 | 2-4 | 0-8 |
| ZrO$_2$ | >0-8 | >0-8 | >0-8 | 0.5-4 | >0-8 | >0-8 | >0-8 | >0-8 | 0.5-4 |
| TiO$_2$ | 0-4 | 0-4 | 0-4 | 0-4 | 0-4 | 0-4 | 0-4 | 0-4 | 0-4 |
| P$_2$O$_5$ | >0-5 | >0-5 | >0-5 | >0-5 | 1-3 | >0-5 | >0-5 | >0-5 | >0-5 |

| Oxide (wt %) | 55 | 56 | 57 | 58 | 59 | 60 | 61 | 62 | 63 |
|---|---|---|---|---|---|---|---|---|---|
| SiO$_2$ | 60-75 | 60-75 | 60-75 | 60-75 | 60-75 | 60-75 | 60-75 | 60-75 | 60-75 |
| Al$_2$O$_3$ | 12-16 | 12-16 | 12-16 | 12-16 | 12-16 | 12-16 | 12-16 | 12-16 | 12-16 |
| B$_2$O$_3$ | 0-4 | 0-4 | 0-4 | 0-4 | 0-4 | 0-4 | 0-4 | 0-4 | 0-4 |
| Li$_2$O | 5-9 | 5-9 | 5-9 | 5-9 | 5-9 | 5-9 | 5-9 | 5-9 | 5-9 |
| Na$_2$O | >0-5 | 0.5-2 | 0.5-2 | 0.5-2 | 0.5-2 | 0.5-2 | 0.5-2 | 0.5-2 | 0.5-2 |
| K$_2$O | 0-4 | 0-4 | 0-4 | 0-4 | 0-4 | 0-4 | 0-4 | 0-4 | 0-4 |
| MgO | 0-8 | 1-3 | 0-8 | 0-8 | 0-8 | 1-3 | 1-3 | 1-3 | 1-3 |
| ZnO | 0-8 | 0-8 | 2-4 | 0-8 | 0-8 | 2-4 | 0-8 | 0-8 | 2-4 |
| ZrO$_2$ | >0-8 | >0-8 | >0-8 | 0.5-4 | >0-8 | >0-8 | 0.5-4 | >0-8 | 0.5-4 |
| TiO$_2$ | 0-4 | 0-4 | 0-4 | 0-4 | 0-4 | 0-4 | 0-4 | 0-4 | 0-4 |
| P$_2$O$_5$ | 1-3 | >0-5 | >0-5 | >0-5 | 1-3 | >0-5 | >0-5 | 1-3 | >0-5 |

TABLE 1-continued

| Oxide (wt %) | 64 | 65 | 66 | 67 | 68 | 69 | 70 | 71 | 72 |
|---|---|---|---|---|---|---|---|---|---|
| $SiO_2$ | 60-75 | 60-75 | 60-75 | 60-75 | 60-75 | 60-75 | 60-75 | 60-75 | 60-75 |
| $Al_2O_3$ | 12-16 | 12-16 | 10-20 | 10-20 | 10-20 | 10-20 | 10-20 | 10-20 | 10-20 |
| $B_2O_3$ | 0-4 | 0-4 | 0-4 | 0-4 | 0-4 | 0-4 | 0-4 | 0-4 | 0-4 |
| $Li_2O$ | 5-9 | 5-9 | 5-9 | 5-9 | 5-9 | 5-9 | 5-9 | 5-9 | 5-9 |
| $Na_2O$ | 0.5-2 | 0.5-2 | 0.5-2 | >0-5 | >0-5 | >0-5 | >0-5 | 0.5-2 | 0.5-2 |
| $K_2O$ | 0-4 | 0-4 | 0-4 | 0-4 | 0-4 | 0-4 | 0-4 | 0-4 | 0-4 |
| MgO | 1-3 | 1-3 | 0-8 | 1-3 | 0-8 | 0-8 | 0-8 | 1-3 | 0-8 |
| ZnO | 2-4 | 2-4 | 0-8 | 0-8 | 2-4 | 0-8 | 0-8 | 0-8 | 2-4 |
| $ZrO_2$ | >0-8 | 0.5-4 | >0-8 | >0-8 | >0-8 | 0.5-4 | >0-8 | >0-8 | >0-8 |
| $TiO_2$ | 0-4 | 0-4 | 0-4 | 0-4 | 0-4 | 0-4 | 0-4 | 0-4 | 0-4 |
| $P_2O_5$ | 1-3 | 1-3 | >0-5 | >0-5 | >0-5 | >0-5 | 1-3 | >0-5 | >0-5 |

| Oxide (wt %) | 73 | 74 | 75 | 76 | 77 | 78 | 79 | 80 | 81 |
|---|---|---|---|---|---|---|---|---|---|
| $SiO_2$ | 60-75 | 60-75 | 60-75 | 60-75 | 60-75 | 60-75 | 60-75 | 60-75 | 60-75 |
| $Al_2O_3$ | 10-20 | 10-20 | 10-20 | 10-20 | 10-20 | 10-20 | 10-20 | 10-20 | 10-20 |
| $B_2O_3$ | 0-4 | 0-4 | 0-4 | 0-4 | 0-4 | 0-4 | 0-4 | 0-4 | 0-4 |
| $Li_2O$ | 5-9 | 5-9 | 5-9 | 5-9 | 5-9 | 5-9 | 5-9 | 5-9 | 4-14 |
| $Na_2O$ | 0.5-2 | 0.5-2 | 0.5-2 | 0.5-2 | 0.5-2 | 0.5-2 | 0.5-2 | 0.5-2 | 0.5-2 |
| $K_2O$ | 0-4 | 0-4 | 0-4 | 0-4 | 0-4 | 0-4 | 0-4 | 0-4 | 0-4 |
| MgO | 0-8 | 0-8 | 1-3 | 1-3 | 1-3 | 1-3 | 1-3 | 1-3 | 1-3 |
| ZnO | 0-8 | 0-8 | 2-4 | 0-8 | 0-8 | 2-4 | 2-4 | 2-4 | 0-8 |
| $ZrO_2$ | 0.5-4 | >0-8 | >0-8 | 0.5-4 | >0-8 | 0.5-4 | >0-8 | 0.5-4 | >0-8 |
| $TiO_2$ | 0-4 | 0-4 | 0-4 | 0-4 | 0-4 | 0-4 | 0-4 | 0-4 | 0-4 |
| $P_2O_5$ | >0-5 | 1-3 | >0-5 | >0-5 | 1-3 | >0-5 | 1-3 | 1-3 | >0-5 |

| Oxide (wt %) | 82 | 83 | 84 | 85 | 86 | 87 | 88 | 89 | 90 |
|---|---|---|---|---|---|---|---|---|---|
| $SiO_2$ | 60-75 | 60-75 | 60-75 | 60-75 | 60-75 | 60-75 | 60-75 | 60-75 | 60-75 |
| $Al_2O_3$ | 10-20 | 10-20 | 10-20 | 10-20 | 10-20 | 10-20 | 10-20 | 10-20 | 10-20 |
| $B_2O_3$ | 0-4 | 0-4 | 0-4 | 0-4 | 0-4 | 0-4 | 0-4 | 0-4 | 0-4 |
| $Li_2O$ | 4-14 | 4-14 | 4-14 | 4-14 | 4-14 | 4-14 | 4-14 | 4-14 | 4-14 |
| $Na_2O$ | 0.5-2 | 0.5-2 | 0.5-2 | 0.5-2 | 0.5-2 | 0.5-2 | 0.5-2 | 0.5-2 | 0.5-2 |
| $K_2O$ | 0-4 | 0-4 | 0-4 | 0-4 | 0-4 | 0-4 | 0-4 | 0-4 | 0-4 |
| MgO | 0-8 | 0-8 | 0-8 | 1-3 | 1-3 | 0-8 | 1-3 | 1-3 | 1-3 |
| ZnO | 2-4 | 0-8 | 0-8 | 2-4 | 0-8 | 0-8 | 2-4 | 2-4 | 2-4 |
| $ZrO_2$ | >0-8 | 0.5-4 | >0-8 | >0-8 | 0.5-4 | >0-8 | 0.5-4 | >0-8 | 0.5-4 |
| $TiO_2$ | 0-4 | 0-4 | 0-4 | 0-4 | 0-4 | 0-4 | 0-4 | 0-4 | 0-4 |
| $P_2O_5$ | >0-5 | >0-5 | 1-3 | >0-5 | >0-5 | 1-3 | >0-5 | 1-3 | 1-3 |

| Oxide (wt %) | 91 | 92 | 93 | 94 | 95 | 96 | 97 | 98 | 99 |
|---|---|---|---|---|---|---|---|---|---|
| $SiO_2$ | 60-75 | 60-75 | 60-75 | 60-75 | 60-75 | 60-75 | 60-75 | 60-75 | 60-75 |
| $Al_2O_3$ | 10-20 | 10-20 | 10-20 | 10-20 | 10-20 | 10-20 | 10-20 | 10-20 | 10-20 |
| $B_2O_3$ | 0-4 | 0-4 | 0-4 | 0-4 | 0-4 | 0-4 | 0-4 | 0-4 | 0-4 |
| $Li_2O$ | 4-14 | 4-14 | 4-14 | 4-14 | 4-14 | 4-14 | 4-14 | 4-14 | 4-14 |
| $Na_2O$ | >0-5 | >0-5 | >0-5 | >0-5 | >0-5 | >0-5 | >0-5 | >0-5 | >0-5 |
| $K_2O$ | 0-4 | 0-4 | 0-4 | 0-4 | 0-4 | 0-4 | 0-4 | 0-4 | 0-4 |
| MgO | 1-3 | 1-3 | 1-3 | 1-3 | 1-3 | 1-3 | 0-8 | 0-8 | 0-8 |
| ZnO | 2-4 | 0-8 | 0-8 | 2-4 | 2-4 | 2-4 | 2-4 | 2-4 | 2-4 |
| $ZrO_2$ | >0-8 | 0.5-4 | >0-8 | 0.5-4 | >0-8 | 0.5-4 | 0.5-4 | >0-8 | 0.5-4 |
| $TiO_2$ | 0-4 | 0-4 | 0-4 | 0-4 | 0-4 | 0-4 | 0-4 | 0-4 | 0-4 |
| $P_2O_5$ | >0-5 | >0-5 | 1-3 | >0-5 | 1-3 | 1-3 | >0-5 | 1-3 | 1-3 |

| Oxide (wt %) | 100 | 101 | 102 | 103 | 104 |
|---|---|---|---|---|---|
| $SiO_2$ | 60-75 | 60-75 | 60-75 | 60-70 | 60-70 |
| $Al_2O_3$ | 10-20 | 12-16 | 12-16 | 12-16 | 12-16 |
| $B_2O_3$ | 0-4 | 0-4 | 0-4 | 0-4 | 0-4 |
| $Li_2O$ | 4-14 | 5-9 | 5-9 | 4-14 | 4-14 |
| $Na_2O$ | >0-5 | 0.5-2 | 0.5-2 | >0-5 | >0-5 |
| $K_2O$ | 0-4 | 0-4 | 0-4 | 0-4 | 0-4 |
| MgO | 0-8 | 0-8 | 0-8 | 0-8 | 0-8 |
| ZnO | 0-8 | 2-4 | 2-4 | 2-4 | 0-8 |
| $ZrO_2$ | 0.5-4 | >0-8 | >0-8 | >0-8 | 0.5-4 |
| $TiO_2$ | 0-4 | 0-4 | 0-4 | 0-4 | 0-4 |
| $P_2O_5$ | 1-3 | 1-3 | >0-5 | 1-3 | 1-3 |

In another embodiment, a glass composition (and the ceramic composition made by ceramming the glass) is characterized by the following compositional parameters, where the amounts are in weight percent based on the weight of the whole composition:
60-70 wt % $SiO_2$
12-16 wt % $Al_2O_3$
5-9 wt % $Li_2O$
0.5-2 wt % $Na_2O$
0.5-8 wt % $ZrO_2$
1-3 wt % $P_2O_5$
0-3 wt % $SnO_2$, $As_2O_3$, $Sb_2O_3$, F, Cl, Br, $CeO_2$, $Fe_2O_3$
0-4 wt % $B_2O_3$
1-3 wt % MgO
2-4 wt % ZnO.

In some embodiments, the composition comprises 0 to 0.5 wt % $SnO_2$, $As_2O_3$, $Sb_2O_3$, F, Cl, Br, $CeO_2$, $Fe_2O_3$ or other fining agent. In some embodiments, the composition comprises less than 2, less than 1, or less than 0.5 wt % of total oxides other than those recited above. As with other compositions of the current teachings, in various embodiment a glass composition in this paragraph is further characterized by having no more than low to tramp levels of titanium dioxide, such that total titanium dioxide is less than 1, less than 0.5, less than 0.2, less than 0.1, less than 0.05, or less than 0.01 wt % of the total weight of the composition, or is 0 wt %, or is undetectable. Alternatively or in addition, in some embodiments, the compositions are characterized by having no more than low to tramp levels of potassium oxide, such that total potassium oxide is less than 1, less than 0.5, less than 0.2, less than 0.1, less than 0.05, or less than 0.01 wt % of the total weight of the composition, or is 0 wt %, or is undetectable.

Although the invention is not limited by any theory of operation, the viscosity, thermal expansion, and mechanical performance of the glasses and ceramics are influenced by the component oxides and their interactions. In the glass compositions described herein, $SiO_2$ serves as the primary glass-forming oxide for precursor glass. The concentration of $SiO_2$ should be sufficiently high in order to form β-spodumene or β-quartz crystal phase when the precursor glass is heat treated to convert to a glass-ceramic (cerammed). However, the glasses should not contain too high levels of $SiO_2$, because the melting temperature (200 poise temperature) of pure $SiO_2$ or high-$SiO_2$ glasses is generally higher than desired. $SiO_2$, which forms the matrix of the glass, is present at a concentration ranging from 60 to 75 wt %. For example, in some embodiments, the amount of $SiO_2$ in the glass ceramic is 60 to 68%, 60 to 66%, 60 to 64%, 60 to 62%, 62 to 70%, 64 to 70%, 66 to 70%, or 68 to 70%. In some embodiments, the amount of $SiO_2$ in the glass ceramic is 60, 61, 62, 63, 64, 65, 66, 67, 68, 69, or 70%, or within a range including and between any two of these values.

$B_2O_3$ may be used as a flux to soften glasses, making them easier to melt. $B_2O_3$ can also help increases the toughness of the glass by minimizing the number of weak non-bridging oxygen atoms (NBOs) by converting the NBOs to bridging oxygen atoms through the formation of $BO_4$ tetrahedra. In some embodiments, $B_2O_3$ can increase the mechanical durability of the glass and/or glass ceramic. In some embodiments, the amount of $B_2O_3$ in the glass/glass ceramic is 0 to 4 wt % or >0 to 4 wt %. In some embodiments, the amount of $B_2O_3$ in the glass/glass ceramic is 0, >0, 0.5, 1, 2, 3, or 4 wt %.

Alkali metal oxides, for example, $Na_2O$ and $Li_2O$, can facilitate melting, soften the glass, enable ion exchange, decrease melt resistivity, and break up the glass network which increases thermal expansion, but decreases durability. They can also influence the resulting glass ceramic. In particular, $Li_2O$, in combination with $Al_2O_3$ and $SiO_2$, helps in the formation of a β-spodumene or β-quartz crystal phase in the cerammed glass-ceramic. $Li_2O$ may act as a flux to decrease the melting temperature required to fuse the precursor glass, and improve the whiteness of the glass-ceramic. However, too much $Li_2O$ can result in undesirably high liquidus temperature of the precursor glass. In some embodiments, the amount of $Li_2O$ in the glass/glass ceramic is 4 to 14 wt % or 5 to 9 wt %. In some embodiments, the amount of $Li_2O$ is 4, 5, 6, 7, 8, 9, 10, 11, 12, 13, or 14 wt %, or within a range including and between any two of these values.

Including $Na_2O$ in the composition can reduce the melting temperature of the glass and shorten the ceramming cycle as well. Furthermore, the addition of $Na_2O$ can also decrease the viscosity of residual glass and reduce cracks associated with ceramming. In some embodiments, the amount of $Na_2O$ in the glass ceramic is greater than zero to 5%, 0.5 to 5, 0.5 to 4, 0.5 to 3, or 0.5 to 2 wt %. In some embodiments, the amount of $Na_2O$ is 0.5, 1, 1.5, 2, 2.5, 3, 3.5, 4, 4.5, or 5 wt %, or within a range including and between any two of these values.

$K_2O$ is found in some of the glasses and glass ceramics described herein. In some embodiments, it may be found in tramp amounts, or at levels from 0 to 4, >0 to 4, 0 to 3, >0 to 3, 0 to 2, >0 to 2, 0 to 1, >0 to 1, 0 to 0.5, or >0 to 0.5. In some embodiments, the amount of $B_2O_3$ in the glass/glass ceramic is 0, >0, 0.5, 1, 2, 3, or 4 wt %. 0 to 4, 0 to 1.5, 0 to 1, 0 to 0.5, or 0 to 0.1 wt %, or tramp or undetectable amounts.

As noted above, $Al_2O_3$ helps in the formation of β-spodumene or β-quartz crystal phases in the cerammed glass-ceramic embodied herein. $Al_2O_3$ can be favorable in improving the mechanical properties of the glasses and glass ceramics as well. Furthermore, $Al_2O_3$ and, to a lesser extent, zirconia ($ZrO_2$) generally have the opposite effect of the alkali metal oxides. $Al_2O_3$ scavenges non-bridging oxygen atoms (NBOs) to form $AlO_4$ tetrahedra while making the glass thermally harder. Alumina and zirconia provide lower expansion and greater durability but, at high concentrations, make the glass more difficult to melt. In some embodiments, the amount of $Al_2O_3$ in the glass ceramic is 10 to 20 wt %. In some embodiments, the amount of $Al_2O_3$ in the glass ceramic is 12 to 16 wt %. In some embodiments, the amount of $Al_2O_3$ in the glass ceramic is 10, 11, 12, 13, 14, 15, 16, 17, 18, 19, or 20 wt %, or within a range including and between any two of these values.

In addition to its role as a potential network former or intermediate in the precursor glasses, $ZrO_2$ appears to play a role in improving the stability in embodied $Li_2O$—$Al_2O_3$—$SiO_2$—$P_2O_5$ glasses/glass ceramics by reducing glass devitrification during forming and by lowering liquidus temperature. Clear glasses can be formed from glasses containing over 0.5 wt % $ZrO_2$. In some embodiments, $ZrO_2$ can be in the range of 1.0 to 6.0 wt % without causing liquidus concerns. At concentrations above 8 wt %, zircon forms as a primary liquidus phase at a high temperature, which significantly lowers viscosity at the liquidus. The addition of $ZrO_2$ also helps decrease the grain size, which is important to achieve a desirable strength. In some embodiments, the amount of $ZrO_2$ in the glass ceramic is greater than zero to 8 wt %. In some embodiments, the amount of $ZrO_2$ in the glass ceramic is 0.5 to 8 wt %. In some embodiments, the amount of $ZrO_2$ in the glass ceramic is 0.5 to 4 wt % or greater 0.5 to 6 wt %. In some embodiments, the amount of $ZrO_2$ in the glass ceramic is 0.5-4. In some embodiments, the amount of $ZrO_2$ is 0.01, 0.1, 0.5, 1, 2, 3, 4, 5, 6, 7, or 8 wt %, or within a range including and between any two of these values.

The glass and glass-ceramic compositions comprise $P_2O_5$ serving as a nucleating agent to produce bulk nucleation. If the concentration of $P_2O_5$ is too low, the precursor glass does not crystallize. If the concentration is too high, the devitrification, upon cooling during precursor glass forming, can be difficult to control. In some embodiments, the amount of $P_2O_5$ in the glass ceramic is greater than zero to 5%, greater than 0 to 4 wt %, or 1 to 3 wt %. In some embodiments, the amount of $P_2O_5$ is 0, >0, 0.01, 0.1, 0.5, 1, 2, 3, 4, or 5 wt %, or within a range including and between any two of these values.

In some embodiments, the amount of MgO in the glass ceramic is zero to 8 wt %. In some embodiments, the amount of MgO is no greater than 3 wt %, for example 0 to 3, >0 to 3, or 1 to 3 wt %. In some embodiments, the amount of MgO is 0.001, 0.01, 0.1, 0.5, 1, 2, 3, 4, 5, 6, 7, or 8 wt %, or within a range including and between any two of these values.

In some embodiments, the amount of ZnO in the glass ceramic is zero to 8 wt %. In some embodiments, the amount of ZnO is no greater than 3 wt % or no greater than 4 wt %, for example 0 to 3, >0 to 3, or 1 to 3, or 0 to 4, >0 to 4, or 1 to 4, or 2 to 4 wt %. In some embodiments, the amount of ZnO is 0.001, 0.01, 0.1, 0.5, 1, 2, 3, 4, 5, 6, 7, or 8 wt %, or within a range including and between any two of these values.

$TiO_2$ may be present in some embodiments and may help in nucleation and/or phase separation. TiO2 is present at levels from 0-4 wt %. In some embodiments, the compositions comprise 3, 2, or 1% or less by weight of $TiO_2$, and in some embodiments, there is no more than tramp levels of $TiO_2$ in the glass composition. For example, $TiO_2$ may be present at less than 0.5, less than 0.2, less than 0.1, less than 0.05, or less than 0.01 wt %. In some embodiments, there is no measurable $TiO_2$ in the formulation.

In some embodiments, the glass compositions above comprise the components listed above along with 0 to 3 wt % or >0 to 3 wt % $Fe_2O_3$, or from 0 to 3 wt % or >0 to 3 wt % of one or more of $Nb_2O_5$, $MoO_3$, $Ta_2O_5$, $WO_3$, $La_2O_3$, $HfO_2$, CdO, $CeO_2$, $F^-$, $Cl^-$, $Br^-$, or $I^-$. In some embodiments, the glass and glass ceramic compositions may comprise additional components such as color enhancers or colorants. Such compounds include, for example, $Fe_2O_3$, $Bi_2O_3$, and the like.

As a result of the raw materials and/or equipment used to produce the glass or glass ceramic composition of the present invention, certain impurities or components that are not intentionally added, can be present in the final glass or glass ceramic composition. Such materials are present in the glass or glass ceramic composition in minor amounts (<1, <0.5, <0.1, <0.05, <0.01, <0.005, <0.001, <0.0005, or <0.0001 wt %) and are referred to herein as "tramp materials." Tramp compounds that may be found in glass or glass ceramic embodied herein include, but are not limited to, $Nb_2O_5$, $MoO_3$, $Ta_2O_5$, $WO_3$, $La_2O_3$, $HfO_2$, CdO, $Fe_2O_3$, $CeO_2$, $As_2O_3$, $Sb_2O_3$, sulfur-based compounds such as sulfates, halogens, or combinations thereof.

In some embodiments, the glass or glass ceramic further includes a chemical fining agent. Such fining agents include, but are not limited to, $SnO_2$, $As_2O_3$, $Sb_2O_3$, F, Cl and Br. In some embodiments, the concentrations of the chemical fining agents are kept at a level from 0 to 3, 2, 1, 0.5, 0.1 0.05, 0.01, 0.005, 0.001, 0.0005, or 0.0001 wt %, or from >0 to 3, 2, 1, 0.5, 0.1 0.05, 0.01, 0.005, 0.001, 0.0005, or 0.0001 wt %. The glass composition can have low levels of conventional fining agents, for example 0.0005-0.5 wt % $SnO_2$. Chemical fining agents may also include $CeO_2$, $Fe_2O_3$, and other oxides of transition metals. These oxides may introduce color to the glass or glass ceramic via visible absorptions in their final valence state(s) in the glass, and thus, when present, their concentration is usually kept at a level of 0.5, 0.4, 0.3, 0.2, 0.1 or >0 wt %.

Compared to $As_2O_3$ and $Sb_2O_3$ fining, tin fining (i.e., $SnO_2$ fining) is less effective, but $SnO_2$ is a ubiquitous material that has no known hazardous properties. Tin fining can be used alone or in combination with other fining techniques if desired. For example, tin fining can be combined with halide fining, e.g., bromine fining. Other possible combinations include, but are not limited to, tin fining plus sulfate, sulfide, cerium oxide, mechanical bubbling, and/or vacuum fining. It is contemplated that these other fining techniques can be used alone. U.S. Pat. Nos. 5,785,726, 6,128,924, 5,824,127 and co-pending U.S. application Ser. No. 11/116,669, all of which are hereby incorporated by reference in their entireties, disclose processes for manufacturing arsenic-free glasses. U.S. Pat. No. 7,696,113, incorporated by reference in its entirety, discloses a process for manufacturing arsenic- and antimony-free glass using iron and tin to minimize gaseous inclusions.

The glasses or glass ceramics can also contain $SnO_2$ either as a result of Joule melting using tin-oxide electrodes, through the batching of tin containing materials, e.g., $SnO_2$, SnO, $SnCO_3$, $SnC_2O_2$, etc., or through addition of $SnO_2$ as an agent to adjust various physical, melting, and forming attributes. The glass can comprise from 0 3, 2, 1, 0.5, 0.1 0.05, 0.01, 0.005, 0.001, 0.0005, or 0.0001 wt %, $SnO_2$, or from >0 to 3, 2, 1, 0.5, 0.1 0.05, 0.01, 0.005, 0.001, 0.0005, or 0.0001 wt % $SnO_2$.

Additional components can be incorporated into the glass compositions to provide additional benefits or alternatively, the glass can further comprise contaminants typically found in commercially-prepared glass. For example, additional components can be added to adjust various physical, melting, and forming attributes. The glasses, according to some embodiments, can also include various contaminants associated with batch materials and/or introduced into the glass by the melting, fining, and/or forming equipment used to produce the glass (e.g., $ZrO_2$). In some embodiments, the glass may comprise one or more compounds useful as ultraviolet radiation absorbers. In some embodiments, the glass can comprise 3 wt % or less $Nb_2O_5$, $MoO_3$, $Ta_2O_5$, $WO_3$, $La_2O_3$, $HfO_2$, CdO, $Fe_2O_3$, $CeO_2$, halogens, or combinations thereof. In some embodiments, the glass can comprise from 0 to 3, 2, 1, 0.5, 0.1 0.05, 0.01, 0.005, 0.001, 0.0005, or 0.0001 wt %, or from >0 to 3, 2, 1, 0.5, 0.1 0.05, 0.01, 0.005, 0.001, 0.0005, or 0.0001 wt % $Nb_2O_5$, $MoO_3$, $Ta_2O_5$, $WO_3$, $La_2O_3$, $HfO_2$, CdO, $CeO_2$, $Fe_2O_3$, halogens, or combinations thereof.

The current teachings also provide ceramic compositions that are made by ceramming any of the above glass compositions. Advantageously, ceramic compositions are characterized by one or both of a CTE of $30 \times 10^{-7}/°$ C. or lower and a fracture toughness of 1.5 $MPa \cdot m^{0.5}$ or greater. After ceramming, the ceramic compositions are characterized by content of the same oxides as are present in the precursor glass compositions before heat treating and crystallizing the glass compositions.

In embodiments disclosed herein, the glass-ceramic composition has an average ring-on-ring strength of at least 70 MPa. In some embodiments, the glass-ceramic composition has a ring-on-ring strength of at least 100 MPa, at least 150

MPa, at least 200 MPa, at least 250 MPa, at least 300 MPa, at least 350 MPa, at least 400 MPa, 100-500 MPa, 100-400 MPa, 100-350 MPa, 100-300 MPa, 100-250 MPa, 100-200 MPa, 100-150 MPa, 150-500 MPa, 150-400 MPa, 150-350 MPa, 150-300 MPa, 150-250 MPa, 150-200 MPa, 200-500 MPa, 200-400 MPa, 200-350 MPa, 200-300 MPa, 200-250 MPa, 250-500 MPa, 250-400 MPa, 250-350 MPa, 250-300 MPa, 300-500 MPa, 300-400 MPa, 300-350 MPa, 400-500 MPa, or 350-400 MPa. In some embodiments, the glass-ceramic composition has a ring-on-ring strength of 70, 80, 90, 100, 110 120, 130, 140, 150, 160, 170, 180, 190, 200, 210, 220, 230, 240, 250, 260, 270, 280, 290, 300, 310, 320, 330, 340, 350, 360, 370, 380, 390, 400, 425, 450, 475, or 500 MPa, or within a range including and between any two of these values.

In some embodiments, the glass-ceramic composition has a fracture toughness of at least 1.5. In some embodiments, the glass-ceramic composition has a fracture toughness of at least 1.5, at least 2, at least 2.5, at least 3, at least 3.5, at least 4, at least 4.5, 1.5-5, 1.5-4.5, 1.5-4, 1.5-3.5, 1.5-3, 1.5-2.5, 1.5-2, 2-5, 2-4.5, 2-4, 2-3.5, 2-3, 2-2.5, 2.5-5, 2.5-4.5, 2.5-4, 2.5-3.5, 2.5-3, 3-5, 3-4.5, 3-4, 3-3.5, 3.5-5, 3.5-4.5, 3.5-4, 4-5, or 4-4.5. In some embodiments, the glass-ceramic composition has a fracture toughness of 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, or 5, or within a range including and between any two of these values.

In another embodiment, a method of making an article comprising a glass ceramic (e.g., cooktop, dishware, substrates for electronic devices or architectural features) involves providing a glass composition according to any of the embodiments discussed herein; forming the glass composition into the shape or the near shape of an article; and subjecting the formed glass composition to heat treating conditions that induce crystallization of the glass to a crystalline structure having β-spodumene or β-quartz of a spherulite-like structure as its primary crystal phase. Thus the finished article is characterized by oxide compositions such as those disclosed herein for precursor glass compositions and crystallized ceramic compositions made from those glasses.

Figure 1:
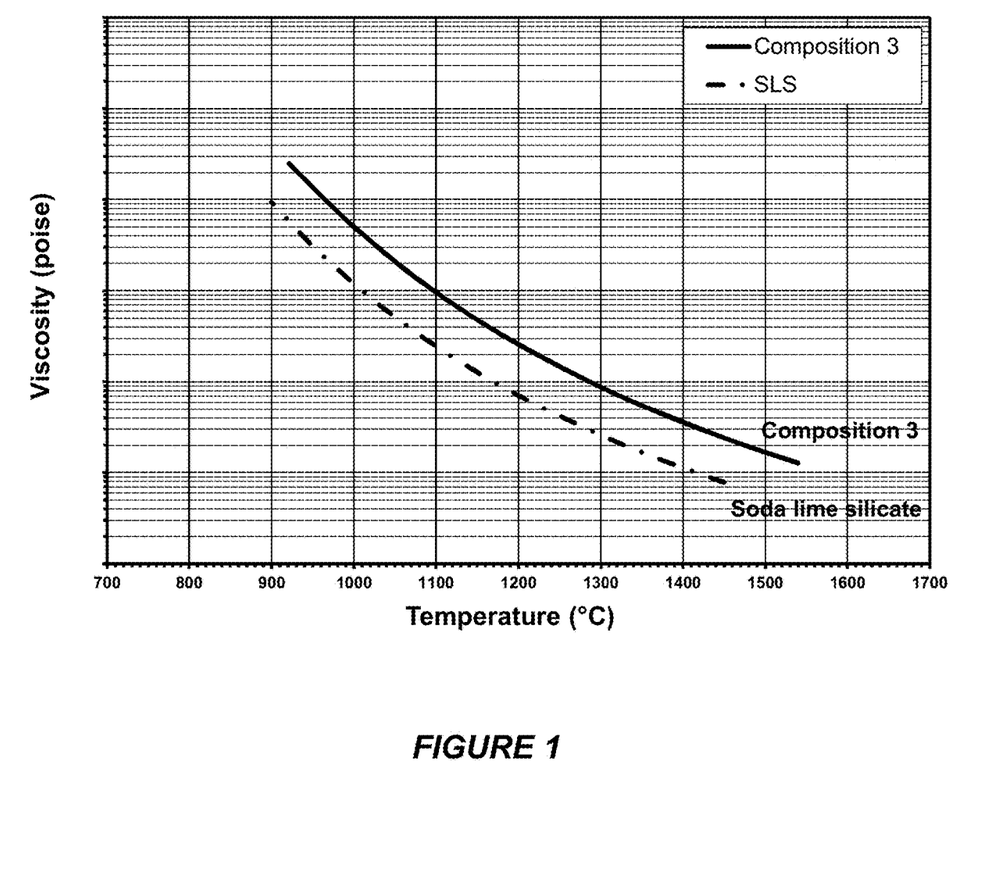
FIG. 1 compares high temperature viscosity of Composition 3, comparing with soda lime silicate glass.

Advantageously, in various embodiments, the precursor glasses have a lower viscosity than conventional ceramics (FIG. 1), which makes them suitable for pressing or molding into thin ware. At the same time, their high temperature viscosity is close to soda lime silicate glass, allowing them to be formed by a float process. Other forming techniques like rolling, pressing and spinning can also be used to form the claimed glasses.

Figure 2:
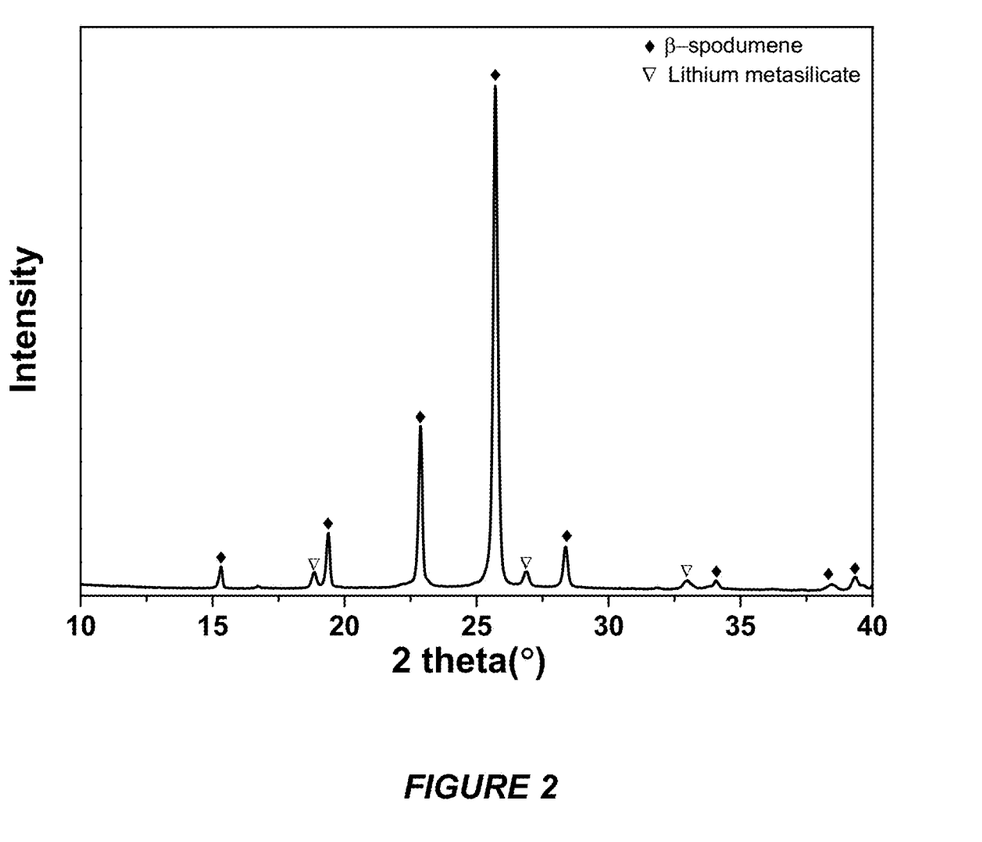
FIG. 2 shows an x-ray diffraction spectrum of Composition 3 cerammed with a cycle of heating to a temperature of 650° C. and maintaining at that temperature for 4 hours (650° C.-4 hr), then heating to a temperature of 800° C. and maintaining at that temperature for 0.5 hours (800° C.-0.5 hr).
Figure 3A:
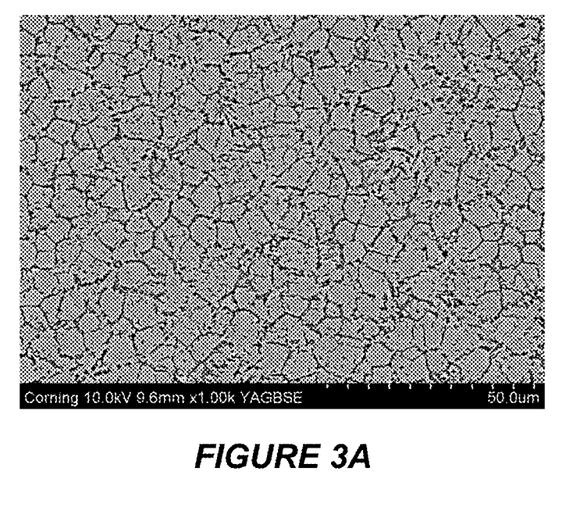
FIG. 3A and FIG. 3B show scanning electron microscopy (SEM) of Composition 3 cerammed with a cycle of 650° C.-4 hr/800° C.-0.5 hr at two magnifications. Sample was etched in 1% HF for 1 min. Black area indicates the residual glass etched away by HF.
Figure 3B:
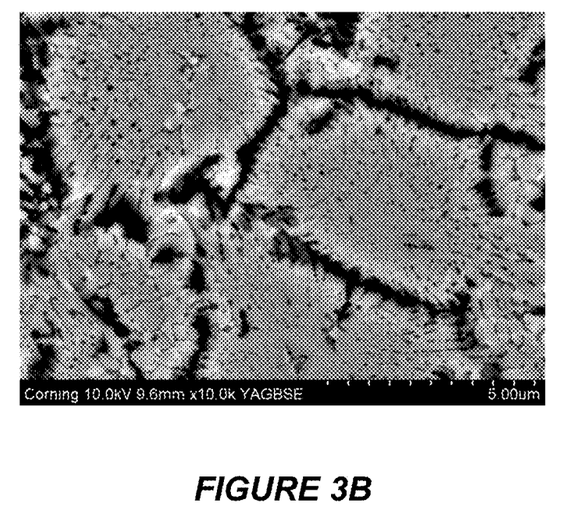

These precursor glasses are cerammed by heat treating into glass-ceramic articles with high crystallinity (typically over 80%, but in some embodiments, from 60 to 99%, 70 to 99%, 80 to 99%, 80 to 95% or over 60%, over 70%, over 80% or over 90%). The major crystallite phase is β-spodumene or β-quartz while lithium metasilicate or lithium disilicate are minor phases depending on compositions (FIG. 2). Glass-ceramic articles containing spherulite structure can be obtained by ceramming precursor glasses at temperatures ranging 800 to 900° C. for a desired time. During the heat treating, the oxides crystalline to form the ceramic structure. Large spherulite grains of 5 to 10 μm are observed in the cerammed part, resulting in an increased toughness (FIG. 3A and FIG. 3B).

In preferred embodiments, CTE of the glass ceramics is lower than $30 \times 10^{-7}/°$ C. while in some embodiments, the glass ceramics have CTEs lower than $10 \times 10^{-7}/°$ C., which makes them suitable for applications with large temperature fluctuations, such as cooktop plates and cooking utensils.

EXAMPLES

Glass compositions having the oxide contents in the table were formulated as follows. The batch materials were thoroughly mixed in a plastic jar using a Turbular mixer in order to secure a homogeneous melt, and subsequently placed into silica and/or platinum crucibles. The crucibles were placed into a furnace and the glass batch was then melted and maintained at temperatures ranging from 1500-1650° C. for times ranging from about 6-16 hours. The melts were thereafter poured into steel molds to yield glass slabs having dimensions of approximately 7×11"½". Subsequently, those slabs were transferred immediately to an annealer operating at about 500-750° C. Samples were held at this temperature for about 1 hour and subsequently cooled overnight.

Once the glass compositions were made, the resulting precursor glasses were cerammed by heat treating. Heat treating is carried out under conditions that lead to crystallization of the glass composition to make a ceramic. Generally, this is done via a two-phase heating process wherein the glass is first heated to a lower temperature to induce nucleation, then heated to a higher temperature to induce crystallization. Non-limiting conditions include first heating to 600° C. to 700° C., 635° C. to 700° C., or 650° C. to 690° C. for from 0.1 to 10 hours or from 2 to 8 hours (called a nucleation step), followed by heating at 725° C. to 1000° C., 725° C. to 950° C., 725° C. to 900° C., or 750° C. to 850° C. for 0.1 to 8 hours or 2 to 4 hours (a crystal growth step). In the examples, the glasses were heated at 690° C. for 4 hours, followed by heat treating at 800° C. for 0.5 hours (Examples 1 to 5) or were heated at 650° C. for 8 hours followed by 800° C. for 0.5 hours (Example 6), or were heated at 650° C. for 8 hours followed by 800° C. for 2 hours (Examples 7 to 12).

Example compositions are shown in Table 2. Liquidus temperature and viscosity were determined by gradient boat method following ASTM C829-81. Appearance was assigned by visual inspection, while the phase assemblage was determined by X-ray diffraction (XRD).

TABLE 2

| Oxides (wt %) | 1 | 2 | 3 | 4 | 5 | 6 |
| --- | --- | --- | --- | --- | --- | --- |
| $SiO_2$ | 69.5 | 68.0 | 68.0 | 68.0 | 68.0 | 67.8 |
| $Al_2O_3$ | 13.0 | 14.6 | 15.1 | 15.6 | 16.1 | 15.1 |
| $Li_2O$ | 8.7 | 8.6 | 8.6 | 8.6 | 8.6 | 6.6 |
| $Na_2O$ | 1.6 | 1.5 | 1.5 | 1.5 | 1.5 | 1.5 |
| $B_2O_3$ | 0.9 | 0.9 | 0.0 | 0.0 | 0.0 | 0.0 |
| MgO | 0.0 | 0.0 | 0.0 | 0.0 | 0.0 | 1.3 |
| ZnO | 0.0 | 0.0 | 0.0 | 0.0 | 0.0 | 2.7 |

TABLE 2-continued

| | | | | | | |
|---|---|---|---|---|---|---|
| $P_2O_5$ | 2.7 | 2.7 | 2.0 | 2.0 | 2.0 | 2.0 |
| $ZrO_2$ | 3.7 | 3.6 | 3.0 | 3.0 | 3.0 | 3.0 |
| Liq Temp (° C.) | | 1200 | 1220 | | | |
| Liq viscosity (poise) | | 2240 | 2036 | | | |
| Ceramming cycle | 690° C.-4/ 800° C.-0.5 hr | 690° C.-4/ 800° C.-0.5 hr | 650° C.-4/ 800° C.-0.5 hr | 690° C.-4/ 800° C.-0.5 hr | 690° C.-4/ 800° C.-0.5 hr | 650° C.-8/ 800° C.-0.5 hr |
| Appearance | Translucent white | Translucent white | Translucent white | Translucent white | Translucent white | Translucent white |
| Phase assemblage | β-spodumene lithium metasilicate | β-spodumene, lithium metasilicate | β-spodumene, lithium metasilicate | β-spodumene, lithium metasilicate | β-spodumene, lithium metasilicate | β-quartz, β-spodumene |
| Crystallinity | >80% | >80% | >80% | >80% | >80% | >80% |
| Thermal expansion (× 10−7/° C.) | 29 | 28 | 28 | 28 | 26 | 4 |
| RoR strength, 3 mm (MPa) | | 72 | 102 | | | |
| Fracture toughness $(MPa.m^{0.5})$ | | 1.8 | 1.7 | | | 1.3 |

| Oxides (wt %) | 7 | 8 | 9 | 10 | 11 | 12 |
|---|---|---|---|---|---|---|
| $SiO_2$ | 68.5 | 68.8 | 69.2 | 68.2 | 68.5 | 68.9 |
| $Al_2O_3$ | 15.2 | 15.3 | 15.4 | 15.1 | 15.2 | 15.3 |
| $Li_2O$ | 6.7 | 6.7 | 6.8 | 7.2 | 7.7 | 8.2 |
| $Na_2O$ | 1.5 | 1.5 | 1.5 | 1.5 | 1.5 | 1.5 |
| $B_2O_3$ | 0.0 | 0.0 | 0.0 | 0.0 | 0.0 | 0.0 |
| MgO | 1.3 | 1.3 | 1.3 | 1.0 | 0.7 | 0.3 |
| ZnO | 2.7 | 2.7 | 2.7 | 2.0 | 1.3 | 0.7 |
| $P_2O_5$ | 2.0 | 2.0 | 2.0 | 2.0 | 2.0 | 2.0 |
| $ZrO_2$ | 2.0 | 1.5 | 1.0 | 3.0 | 3.0 | 3.0 |
| Liq Temp (° C.) | 1250 | 1225 | 1255 | 1270 | 1250 | 1245 |
| Liq viscosity (poise) | 2850 | 3630 | 2650 | 1900 | 2080 | 1890 |
| Ceramming cycle | 650° C.-8/ 800° C.-2.0 hr | 650° C.-8/ 800° C.-2.0 hr | 650° C.-8/ 800° C.-2.0 hr | 65° 0C.-8/ 800° C.-2.0 hr | 650° C.-8/ 800° C.-2.0 hr | 650° C.-8/ 800° C.-2.0 hr |
| Appearance | Translucent white | Translucent white | Translucent white | Translucent white | Translucent white | Translucent white |
| Phase assemblage | β-spodumene | β-spodumene | β-spodumene | β-spodumene | β-spodumene | β-spodumene |
| Thermal expansion (× 10−7/° C.) | 8.4 | 14 | 18.2 | 9.7 | 19.7 | 23.5 |
| RoR strength, 3 mm (MPa) | | | | | | |
| Fracture toughness $(MPa.m^{0.5})$ | | | 1.6 | 1.7 | | |

In an aspect (1), the disclosure provides a glass composition, comprising in weight percent 60-75% $SiO_2$, 10-20% $Al_2O_3$, 0-4% $B_2O_3$, 4-14% $Li_2O$, >0-5% $Na_2O$ 0-4% $K_2O$, 0-8% MgO, 0-8% ZnO, >0-8% $ZrO_2$, 0-4% $TiO_2$, >0-5% $P_2O_5$, and optionally, >0-0.5% $SnO_2$. In another aspect (2), the disclosure provides a glass composition of aspect (1) comprising no more than 2% by weight of other oxides not listed in (1). In another aspect (3), the disclosure provides a glass composition of aspect (1) or aspect (2), comprising one or more of a) 0-1 wt % $TiO_2$, b) 0.1-5 wt % $Na_2O$, c) 0.5-8 wt % $ZrO_2$, or d) 0.5-5 wt % $P_2O_5$. In another aspect (4), the disclosure provides a glass composition of any of aspects (1)-(3), comprising 0.2 wt % or less of $K_2O$. In another aspect (5), the disclosure provides a glass composition of any of aspects (1)-(4), comprising 60-70% silicon dioxide. In another aspect (6), the disclosure provides a glass composition of any of aspects (1)-(5), comprising 12-16% aluminum oxide. In another aspect (7), the disclosure provides a glass composition of any of aspects (1)-(6), comprising 5-9% lithium oxide. In another aspect (8), the disclosure provides a glass composition of any of aspects (1)-(7), comprising 0.5-2% sodium oxide. In another aspect (9), the disclosure provides a glass composition of any of aspects (1)-(8), comprising 1-3% magnesium oxide. In another aspect (10), the disclosure provides a glass composition of any of aspects (1)-(9), comprising 2-4% zinc oxide. In another aspect (11), the disclosure provides a glass composition of any of aspects (1)-(10), comprising 0.5-4% zirconium oxide. In another aspect (12), the disclosure provides a glass composition of any of aspects (1)-(11), comprising 1-3% phosphorus pentoxide.

In an aspect (13), the disclosure provides a glass ceramic composition made by ceramming a glass composition according to any of aspects (1)-(12). In another aspect (14), the disclosure provides a glass ceramic composition of aspect (13), having a coefficient of thermal expansion of $30 \times 10^{-7}$/° C. or lower. In another aspect (15), the disclosure provides a glass ceramic composition of aspect (13) or aspect (14), having a fracture toughness of 1.5 $MPa·m^{0.5}$; or greater.

In an aspect (16), the disclosure provides a glass composition comprising in weight percent 60-70% $SiO_2$, 12-16% $Al_2O_3$, 5-9% $Li_2O$, 0.5-2% $Na_2O$, 0.5-8% $ZrO_2$, 1-3% $P_2O_5$, 0-4% $B_2O_3$, 1-3% MgO, 2-4% ZnO, and optionally 0.05-

0.5% $SnO_2$ and comprising less than 2% by weight of total oxides other than those recited above. In another aspect (17), the disclosure provides a glass composition of aspect (16), comprising 0-1 wt % titanium dioxide. In another aspect (18), the disclosure provides a glass composition of aspect (16) or aspect (17), comprising 0.2 wt % or less potassium oxide.

In an aspect (19), the disclosure provides a glass ceramic composition of any of aspects (16)-(18). In aspect (20) and (21), the disclosure provides a glass composition of aspect (19), having a coefficient of thermal expansion of (20) $30 \times 10^{-7}/°$ C. or lower or (21) $10 \times 10^{-7}/°$ C. or lower. In another aspect (22), the disclosure provides a glass composition of any of aspects (19)-(21), having a fracture toughness of 1.5 $MPa \cdot m^{0.5}$ or greater.

In an aspect (23), the disclosure provides a glass ceramic composition comprising, by weight percent: 60-75% $SiO_2$, 10-20% $Al_2O_3$, 0-4% $B_2O_3$, 4-14% $Li_2O$, >0-5% $Na_2O$, 0-4% $K_2O$, 0-8% MgO, 0-8% ZnO, >0-8% $ZrO_2$, 0-4% $TiO_2$, >0-5% $P_2O_5$, and optionally, >0-0.5% $SnO_2$, wherein the primary phase of the glass ceramic comprises β-spodumene or β-quartz. In an aspect (24), the disclosure provides a glass ceramic composition of aspect (23), comprising one or more of a) 0-1 wt % $TiO_2$, b) 0.1-5 wt % $Na_2O$, c) 0.5-8 wt % $ZrO_2$, or d) 0.5-5 wt % $P_2O_5$ or e) 0.2 wt % or less $K_2O$. In an aspect (25), the disclosure provides a glass ceramic composition of aspect (23) or aspect (24), comprising: 60-70% $SiO_2$, 12-16% $Al_2O_3$, 5-9% $Li_2O$, 0.5-2% $Na_2O$, 0.5-8% $ZrO_2$, 1-3% $P_2O_5$, 0-4% $B_2O_3$, 1-3% MgO, 2-4% ZnO, and optionally 0.05-0.5% $SnO_2$ and comprising less than 2% by weight of total oxides other than those recited above. In an aspect (26), the disclosure provides a glass ceramic composition of any of aspects (23)-(25), wherein the glass ceramic is greater than 60% crystalline and comprises spherulite grains having an average grain size of from 5-10 μm. In an aspect (27), the disclosure provides a glass ceramic composition of any of aspects (23)-(26), having a coefficient of thermal expansion of $30 \times 10^{-7}/°$ C. or lower. In an aspect (28), the disclosure provides a glass ceramic composition of any of aspects (23)-(26), having a coefficient of thermal expansion of $10 \times 10^{-7}/°$ C. or lower.

In an aspect (29), the disclosure provides an article comprising a glass ceramic composition of any of aspects (23)-(28). In an aspect (30), the article of aspect (29) comprises a cooktop, a utensil, a dishware, a substrate or covering for an electronic device, or a substrate or aspect of an architectural or automotive article.

In an aspect (31), the disclosure provides a method of making a glass ceramic comprising: (a) providing a glass composition comprising, by weight percent: 60-75% $SiO_2$, 10-20% $Al_2O_3$, 0-4% $B_2O_3$, 4-14% $Li_2O$, >0-5% $Na_2O$, 0-4% $K_2O$, 0-8% MgO, 0-8% ZnO, >0-8% $ZrO_2$, 0-4% $TiO_2$, >0-5% $P_2O_5$, and optionally, >0-0.5% $SnO_2$, (b) optionally, forming the glass composition into a shape; and (c) subjecting the optionally formed glass composition to heat treating conditions that induce crystallization of the glass to a crystalline structure having β-spodumene or β-quartz as its primary crystal phase. In an aspect (32), the disclosure provides the method of aspect (31), comprising one or more of a) 0-1 wt % $TiO_2$, b) 0.1-5 wt % $Na_2O$, c) 0.5-8 wt % $ZrO_2$, or d) 0.5-5 wt % $P_2O_5$ or e) 0.2 wt % or less $K_2O$. In an aspect (33), the disclosure provides the method of aspect (31) or (32), comprising a glass composition comprising, by weight percent: 60-70% $SiO_2$, 12-16% $Al_2O_3$, 5-9% $Li_2O$, 0.5-2% $Na_2O$, 0.5-8% $ZrO_2$, 1-3% $P_2O_5$, 0-4% $B_2O_3$, 1-3% MgO, 2-4% ZnO, and optionally 0.05-0.5% $SnO_2$ and comprising less than 2% by weight of total oxides other than those recited above. In an aspect (34), the disclosure provides a method of any of aspects (31)-(33), wherein the heat treating conditions comprise a two-step heat treatment, wherein the first step comprises heating the glass to a temperature from 600-700° C. for 0.1 to 10 hours, and the second step comprises heating the glass to a temperature from 725-1000° C. for 0.1 to 8 hours. In an aspect (35), the disclosure provides the method of aspect (34), wherein the temperature for the first step is from 650-690° C. and the temperature for the second step is from 750-850° C. In an aspect (36), the disclosure provides the method of aspect (34) or aspect (35), wherein the time for the first step is from 2-8 hours and the time for the second step is from 2-4 hours. In an aspect (37), the disclosure provides a method of any of aspects (31)-(36), wherein the glass ceramic is greater than 60% crystalline and comprises spherulite grains having an average grain size of from 5-10 μm. In an aspect (38), the disclosure provides a method of any of aspects (31)-(37), wherein the glass ceramic has a coefficient of thermal expansion of $30 \times 10^{-7}/°$ C. or lower. In an aspect (39), the disclosure provides a method of any of aspects (31)-(38), wherein the glass ceramic has a coefficient of thermal expansion of $10 \times 10^{-7}/°$ C. or lower.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A glass ceramic composition comprising, by weight percent:
   60-75% $SiO_2$
   10-20% $Al_2O_3$
   0-4% $B_2O_3$
   >6-9% $Li_2O$
   >0 to 5% $Na_2O$
   0-4% $K_2O$
   0-8% MgO
   0-8% ZnO
   >0 to 8% $ZrO_2$
   0-4% $TiO_2$, and
   >0 to 5% $P_2O_5$, and optionally,
   >0 to 0.5% $SnO_2$
   wherein a primary phase of the glass ceramic comprises β-spodumene or β-quartz.

2. The glass ceramic composition according to claim 1, comprising one or more of a) 0-1 wt % $TiO_2$, b) 0.1-5 wt % $Na_2O$, c) 0.5-8 wt % $ZrO_2$, d) 0.5-5 wt % $P_2O_5$ or e) 0.2 wt % or less $K_2O$.

3. The glass ceramic of claim 1, comprising:
   60-70% $SiO_2$
   12-16% $Al_2O_3$
   >6-9% $Li_2O$
   0.5-2% $Na_2O$
   0.5-8% $ZrO_2$
   1-3% $P_2O_5$
   0-4% $B_2O_3$
   1-3% MgO
   2-4% ZnO, and optionally
   0.05-0.5% $SnO_2$ and comprising less than 2% by weight of total oxides other than those recited above.

4. The glass ceramic composition according to claim 1, wherein the glass ceramic is greater than 60% crystalline and comprises spherulite grains having an average grain size of from 5-10 μm.

5. An article comprising the glass ceramic composition of claim 1.

6. A glass ceramic composition of claim 1, further comprising:
from about 0-3 wt %, one or more of $Nb_2O_5$, $MoO_3$, $Ta_2O_5$, $WO_3$, $La_2O_3$, $HfO_2$, CdO, $Fe_2O_3$, $CeO_2$, or a halogen.

7. A glass ceramic composition of claim 1, wherein the glass ceramic composition has an average ring-on-ring strength from 70 MPa to 500 MPa.

8. A glass ceramic composition of claim 1, wherein the glass ceramic composition has a fracture toughness of 1.5 MPa·m$^{0.5}$ or higher.

9. A glass ceramic composition of claim 1, wherein the glass ceramic has a coefficient of thermal expansion of 30×10$^{-7}$/° C. or lower.

10. A glass ceramic composition comprising, by weight percent:
60-75% $SiO_2$
10-20% $Al_2O_3$
0-4% $B_2O_3$
>6-9% $Li_2O$
>0 to 5% $Na_2O$
0-4% $K_2O$
0-8% MgO
0-8% ZnO
>0 to 8% $ZrO_2$
0-4% $TiO_2$
>0 to 5% $P_2O_5$,
comprising less than 2% by weight of total oxides other than those recited above.

11. A glass ceramic composition of claim 10, further comprising, from about 0-2 wt %, one or more of $Nb_2O_5$, $MoO_3$, $Ta_2O_5$, $WO_3$, $La_2O_3$, $HfO_2$, CdO, $Fe_2O_3$, $CeO_2$, or a halogen.

12. The glass ceramic composition of claim 10, comprising one or more of a) 0-1 wt % $TiO_2$, b) 0.1-5 wt % $Na_2O$, c) 0.5-8 wt % $ZrO_2$, d) 0.5-5 wt % $P_2O_5$, or e) 0.2 wt % or less $K_2O$.

13. A method of making the glass ceramic composition of claim 1, comprising:
providing a glass composition comprising, by weight percent:
60-75% $SiO_2$
10-20% $Al_2O_3$
0-4% $B_2O_3$
>6-9% $Li_2O$
>0 to 5% $Na_2O$
0-4% $K_2O$
0-8% MgO
0-8% ZnO
>0 to 8% $ZrO_2$
0-4% $TiO_2$
>0 to 5% $P_2O_5$, and optionally,
>0 to 0.5% $SnO_2$;
optionally, forming the glass composition into a shape;
subjecting the glass composition to heat treating conditions; and
forming a β-spodumene or β-quartz crystal phase.

14. The method of claim 13, comprising one or more of a) 0-1 wt % $TiO_2$, b) 0.1-5 wt % $Na_2O$, c) 0.5-8 wt % $ZrO_2$, d) 0.5-5 wt % $P_2O_5$, or e) 0.2 wt % or less $K_2O$.

15. The method of claim 13, wherein the heat-treating conditions comprise a two-step heat treatment, wherein the first step comprises heating the glass to a temperature from 600-700° C. for 0.1 to 10 hours, and the second step comprises heating the glass to a temperature from 725-1000° C. for 0.1 to 8 hours.

16. The method of claim 13, wherein the temperature for the first step is from 650-690° C. and the temperature for the second step is from 750-850° C.

17. The method of claim 13, wherein the time for the first step is from 2-8 hours and the time for the second step is from 2-4 hours.

18. The method of claim 13, wherein the glass ceramic is greater than 60% crystalline and comprises spherulite grains having an average grain size of from 5-10 μm.

19. The method of claim 13, wherein the glass ceramic has a coefficient of thermal expansion of 30×10$^{-7}$/° C. or lower.

20. The method of claim 13, wherein the glass ceramic has a fracture toughness of 1.5 MPa·m$^{0.5}$ or higher.

* * * * *

UNITED STATES PATENT AND TRADEMARK OFFICE
CERTIFICATE OF CORRECTION

PATENT NO. : 10,626,046 B2
APPLICATION NO. : 15/728783
DATED : April 21, 2020
INVENTOR(S) : George Halsey Beall et al.

It is certified that error appears in the above-identified patent and that said Letters Patent is hereby corrected as shown below:

On the Title Page

In Column 2, item (56), Other Publications, Line 5, delete "Spodumeme" and insert -- Spodumene --, therefor.

Signed and Sealed this
Twenty-third Day of June, 2020

Andrei Iancu
*Director of the United States Patent and Trademark Office*